June 13, 1961 P. KUSTUSCH 2,987,824
DEPTH GAUGE
Filed May 5, 1958
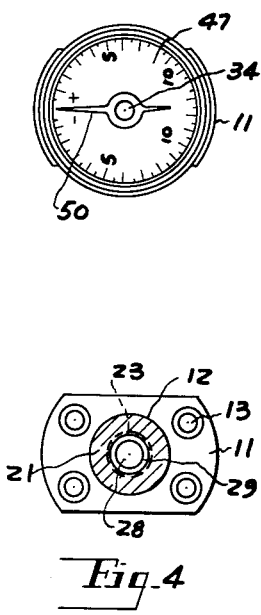
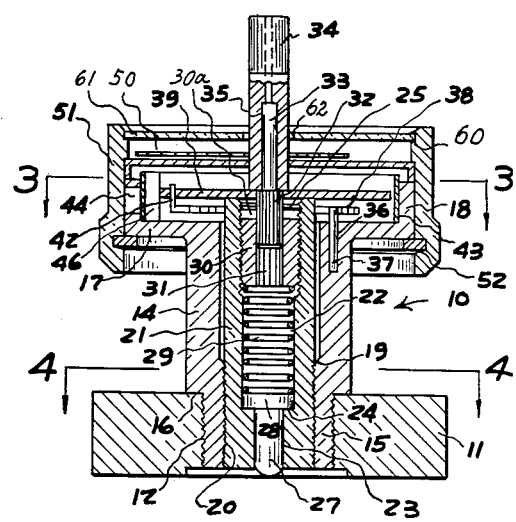
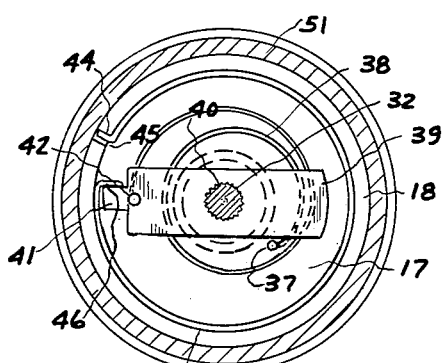
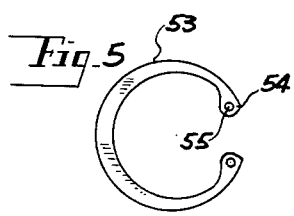
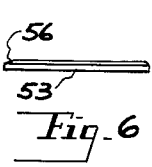
INVENTOR.
Paul Kustusch
BY Louis Chayka
ATTORNEY 2,987,824
Patented June 13, 1961

2,987,824
DEPTH GAUGE
Paul Kustusch, 1029 Maryland St.,
Grosse Pointe 30, Mich.
Filed May 5, 1958, Ser. No. 733,080
1 Claim. (Cl. 33—170)

The gauge is of a type adapted to measure the depth of bores, depressions, and recesses, being especially adapted in instances where minute differences of the depth as compared with a set standard have to be ascertained in such units of length as, for instance, a thousandth of an inch.

In order to attain such degree of accuracy, I have combined a number of elements into a mechanism in which the depth of a given hole or recess is measured by the extent of the axial movement of a screw, and in which mechanism a single turn of the screw to the span of 360 degrees is indicated on a circular calibrated dial by the movement of a pointer along the whole periphery of the dial.

A further object of the invention is to provide a gauge which is semi-automatic in operation, inasmuch as the screw is actuated by a spring, being adapted to rotate under tension thereof till the axial movement of the screw has been brought to a stop on contact of the end of the screw or a member actuated by the screw with the bottom of the recess.

I shall now describe my invention with respect to the accompanying drawings in which:

FIG. 1 is a top elevational view of the gauge;
FIG. 2 is an enlarged vertical view of the gauge;
FIG. 3 is a sectional view on line 3—3 of FIG. 2;
FIG. 4 is a sectional view, in a reduced scale, of the gauge on line 4—4 of FIG. 2;
FIG. 5 is a plan elevational view of a snap ring forming a part of the gauge;
FIG. 6 is a side elevational view of a modified snap ring.

Similar numerals refer to similar parts throughout the several views.

The gauge includes a cylindrical housing, generally indicated by numeral 10. The housing is composed of a thick, flat base 11 having a circular threaded opening 12 in its center and a plurality of vertical holes 13 about said opening for reception of screws whereby the base may be secured to a supporting member which is not shown. Secured to the base and rising therefrom is a hollow, cylindrical column, identified by numeral 14, the connection of the column to the base being effected at the lower end 15 of the column, which lower end is of a reduced diameter and threaded outwardly for engagement with the threaded opening 12. The reduction of the outer diameter of the lower portion of the column results in the formation of a shoulder 16 which bears against the upper surface of the base.

At the top the column includes an integrally-formed annular flange 17 extending horizontally. Associated therewith is an upright circular wall 18 rising from the peripheral portion of the flange, the wall and the flange forming a circular base open at the top and opening at the center into the interior space of the column.

The inner diameter of the lower portion of the column is smaller than the diameter of its upper portion, this structure resulting in the formation at the junction of both portions of an inner shoulder 19. The inner surface of said lower portion of the column, from the inner shoulder 19 downwardly, is threaded, as shown at 20, at the ratio of forty threads to the length of one inch. It will be understood that this is a matter of choice and that any desired number of threads may be used for a unit of length.

Axially located within the column, and being at its lower end in mesh with the threaded inner surface 20 of the column, is a vertical cylinder 21 having an axial bore 22 which opens downwardly into an axial bore 23 of reduced diameter, the junction of the two bores resulting in the formation of a shoulder 24. At the upper end said bore 22 is threaded, as shown at 25. The upper end of the cylinder extends above the level of the flange 17 at the top of the column 14.

Axially fitted into the bore 23, at the lower portion of the cylinder 21, is a pin 27 which at the top carries an integrally-formed head 28 located in the bore 22. Bearing against the head from above is a coiled compression spring 29 which at the top bears against the lower end of a tubular core 30. The latter has a fluted inner bore 31 and a threaded outer surface in mesh with the threaded inner surface 25 of the cylinder 21.

However, the engagement of the tubular core 30 with the cylinder 21 is such that both are to rotate as a unit, for which purpose the tubular core 30 is to be in such tight frictional contact with the cylinder that it would require considerable effort to allow a relative rotary movement therebetween. If desired, some other suitable and well known means may be used for the purpose, such as deforming the inner thread of the cylinder 21 by peening. Numeral 30a indicates a diametrical slot in core 30 for application of a screw driver.

Axially secured within the fluted bore 31 is a serrated plug 32. The latter includes an axial stem 33 extending upwardly from the plug. Mounted upon the stem is a slender cylindrical knob 34 which is provided with a socket 35 for engagement with said stem, the stem fitting axially into said socket with an interference fit in order that it may rotate with said knob.

The wall of the column 14 is provided with a bore 36 of a small diameter opening from the upper level of the flange 17 downwardly, and held within said bore is a vertical rod 37 which extends above the level of said flange. Secured to the upper end of the rod is one end of a spiral spring 38, the spring including a few concentric coils wound about the upper end of the cylinder 21. Disposed horizontally above the spring is a flat bar 39 provided, intermediate its ends, with a serrated circular aperture 40 of a sufficient size for engagement with the correspondingly serrated surface of the plug 32. Mounted upon the plug, the bar is disposed diametrically with respect to said plug and is adapted to be rotated thereby. At one end the plate terminates with a narrow tab 41 which is provided with a small hole 42 for connection to the opposite end of the spiral spring 38.

Disposed upon the flange 17 within the wall 18 is a band 43 hugging said vertical wall 18 but having ends spaced from each other to an arcuate distance of approximately 60 degrees. One end of the band forms a radial tab 44 which is bent at right angle to the tangent line of the cylinder 18 and fits into a radial slot 45 in said wall 18. The opposite end of the band is formed into a similar radial tab 46 but extends towards the center of the casing in which the band is located.

Mounted upon the top surface of the annular wall 18 is a circular dial 47 having thereon a plurality of calibrations 48 to which I shall refer again. Provided in the center with a clearance hole 49, the dial fits axially over the serrated lower portion of the knob 34 without being in contact therewith. Above the level of the dial the serrated lower portion of the knob carries a pointer 50 which is adapted to rotate with said knob.

Enclosing the annular wall 18 is a drum-shaped jacket 51 which at the lower end terminates below the level of the flange 17, and which is provided on its inner surface with an annular groove 52. Fitting into the groove is a split snap ring 53 serving to hold the jacket 51 against displacement from the wall 18. Each of the two ends 54 of the ring is provided with a hole 55. The ring shown in FIG. 6 is modified by having a bevelled face 56 which would be the under face when inserted into said groove 52. At the top the jacket is provided, on the inside, with an annular ledge 60, and seated thereon, in a frictional contact with the inner surface of the jacket, is a circular transparent disk 61 having a central clearance hole 62. The hole is of a sufficient diameter to prevent contact with the knob 34 which extends upwardly therethrough.

In order to describe the operation of the gauge, I will first refer to certain structural features of the gauge. It is to be noted that the cylinder 21 rotates with the plug 32, and that the latter carries the diametrically-disposed bar 39. Disposed in the path of the bar is a radial tab 46 which limits the rotation of the cylinder 21 to somewhat less than 360 degrees.

As the outer surface of the cylinder 21 is in mesh with the threaded inner surface 20 of the column 14, a single 360 degree turn of the cylinder would move it axially to the distance of 1/40 of an inch. During the same turn the pointer 50, rotating with the cylinder 21, would describe, above the face of the dial, a circle of 360 degrees. Now, assuming that the periphery of the dial is divided into 25 equal subdivisions marked by radial tines, each subdivision would indicate 1/1000 of an inch of the axial movement of the cylinder 21 or the pin 27 within the lower end of said cylinder.

Since the gauge is to indicate the extent of the depth beyond a chosen standard, or the extent to which the depth is short of said standard, the dial is provided with a zero mark and a sequence of 12 calibrations clockwise from the zero mark, and 12 calibrations anti-clockwise from said zero mark, one set of 12 calibrations to bear plus signs, the other set to bear minus signs.

Obviously, the zero mark ought to indicate the position of the probing pin at the stage where the lower surface of the pin 27 is at the level of the underside of the base of the gauge. The position of the pointer on the knob, or the position of the dial, has to be first adjusted to that fact, so that the pointer will indicate said zero mark. Once this has been done, the gauge will be in its operative condition.

Assuming now that a depth of a recess has to be ascertained, it will be first necessary to turn the knob against the tension of the spiral spring to the full extent till the rotation will be stopped by the radial tab. At this stage the cylinder 21 will be at its uppermost height and the pointer will indicate calibration 12 minus. Next, with the gauge placed on a firm level support over the recess, the knob is released, whereupon the cylinder, actuated by the spiral spring, and the pointer upon the dial, will rotate in the opposite direction till the depth-probing pin will encounter the bottom of the depression, when the axial movement of the cylinder will cease. The extent of the axial movement will be indicated on the dial by the pointer.

While in the above explanation reference was made to the pin 27 as the depth-probing pin, it will be understood that the gauge may be mounted on a movable supporting block having a vertical bore directly under the pin and a vertically-sliding rod within said bore and in axial contact with the pin 27, and that said sliding rod will serve as the depth-probing member adapted to be inserted into holes or recesses to be gauged.

After having described my gauge, what I wish to claim is as follows:

A depth gauge including a vertical column, a base associated therewith, a horizontally-disposed circular case at the top of the column, the column having an axial bore extending throughout its height the lower portion of said bore being threaded, said bore opening at the top into said case and opening at the lower end at the level of the undersurface of the base, a cylinder axially disposed within the column and threaded for engagement with the inner surface thereof, the cylinder having an axial bore and an axial aperture of a restricted diameter in its lower portion, a vertical depth-probing pin disposed slidingly in said aperture but having a head of expanded diameter in the bore above said aperture, a coiled compression spring within said cylinder, the spring bearing from above against the head of the pin, said pin projecting downwardly out from said cylinder, a stem projecting axially from the upper end of the cylinder into the case, a bar diametrically mounted upon the stem, for rotation therewith, a spiral spring wound about the stem and having one end secured to a stationary member within the case, and having the other end secured to one end of the bar, a stationary tab adjoining the wall of the case and projecting into the path of the bar, a cylindrical knob mounted on the stem and adapted to rotate therewith, a pointer mounted upon the knob and projecting radially therefrom, and a calibrated circular dial supported by the casing at the level below said pointer, the cylinder within the column being adapted to be turned manually about its axis against the tension of said spring to cause axial movement of said cylinder to the distance equal to the pitch of the thread of its outer surface.

References Cited in the file of this patent

UNITED STATES PATENTS

| | | |
|---|---|---|
| 468,519 | Haines | Feb. 9, 1892 |
| 1,414,550 | Cluley | May 2, 1922 |
| 2,533,522 | Sisson | Dec. 12, 1950 |
| 2,662,296 | Stedman | Dec. 15, 1953 |